United States Patent [19]
Eisner

[11] 3,716,413
[45] Feb. 13, 1973

[54] RECHARGEABLE ELECTROCHEMICAL POWER SUPPLY
[75] Inventor: Steve Eisner, Schenectady, N.Y.
[73] Assignee: Norton Company, Troy, N.Y.
[22] Filed: July 15, 1970
[21] Appl. No.: 54,887

[52] U.S. Cl...................136/86 A, 136/140, 136/141
[51] Int. Cl......................H01m 29/04, H01m 31/02
[58] Field of Search ..136/86, 140, 141; 204/36, 227, 204/217

[56] References Cited

UNITED STATES PATENTS 3,440,098   4/1969   Stachurski..........................136/86 A

FOREIGN PATENTS OR APPLICATIONS 17,469   8/1929   Australia................................204/227

Primary Examiner—Allen B. Curtis
Attorney—Hugh E. Smith and Herbert L. Gatewood

[57] ABSTRACT

This invention relates to an improvement in zinc-air and other rechargeable electric storage cells whereby the zinc-electrode surface is mechanically activated allowing the cell to be recharged very rapidly without the growth of dendrites on the zinc plates.

10 Claims, 11 Drawing Figures

PATENTED FEB 13 1973 3,716,413

INVENTOR
Steve Eisner
BY
ATTORNEY

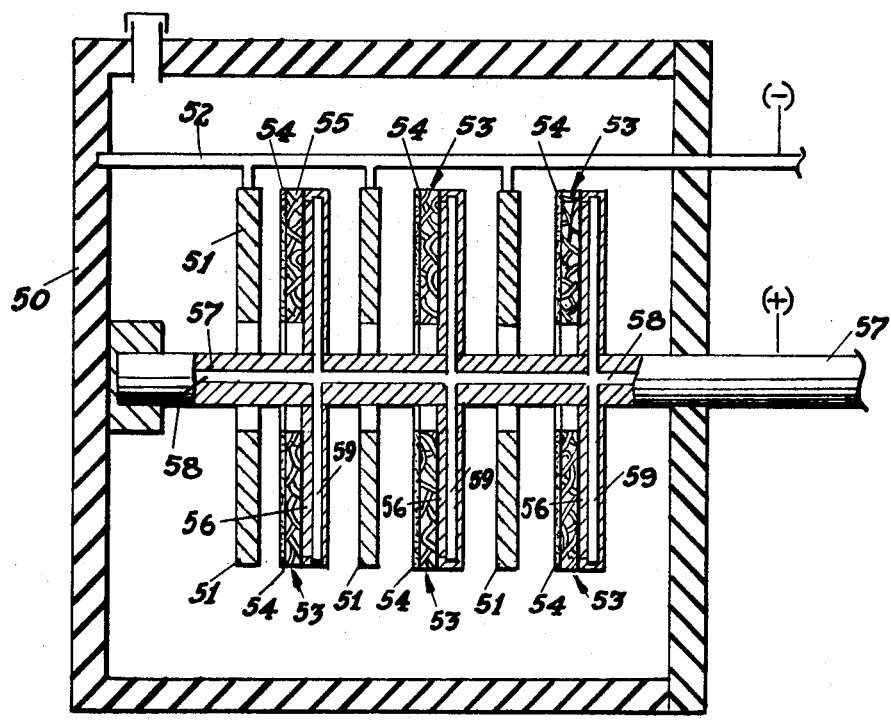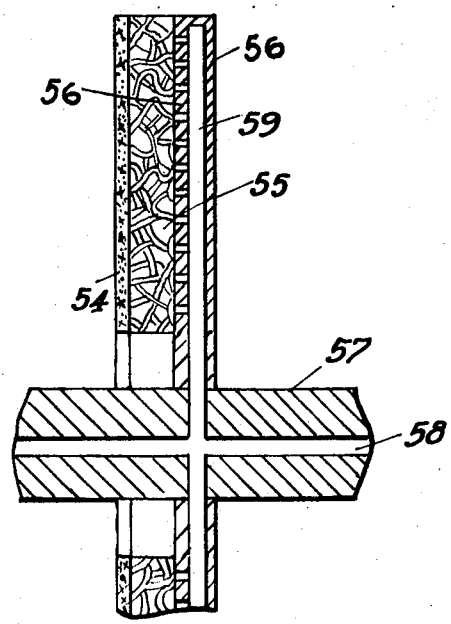

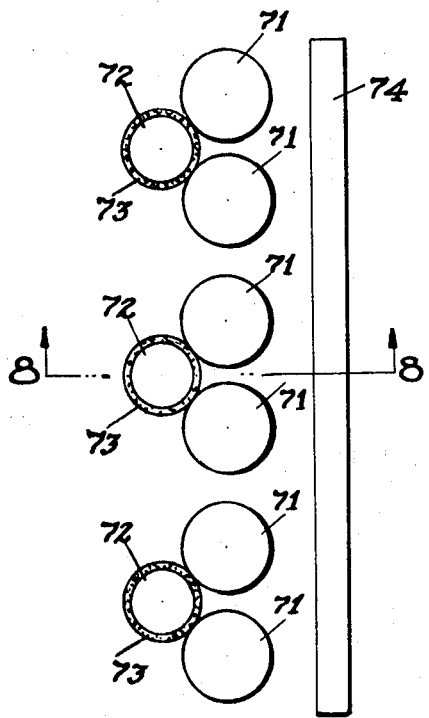
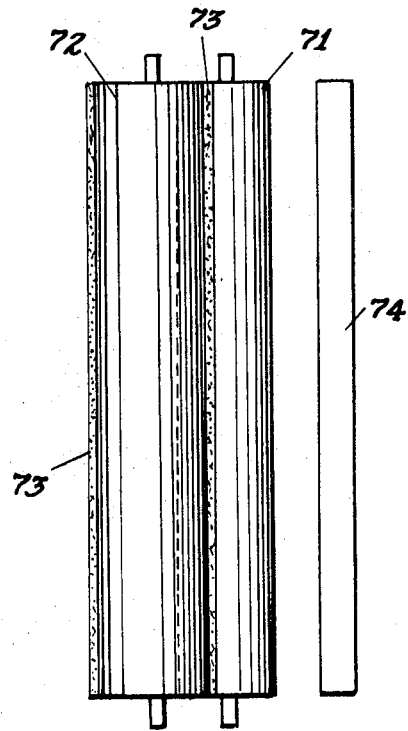
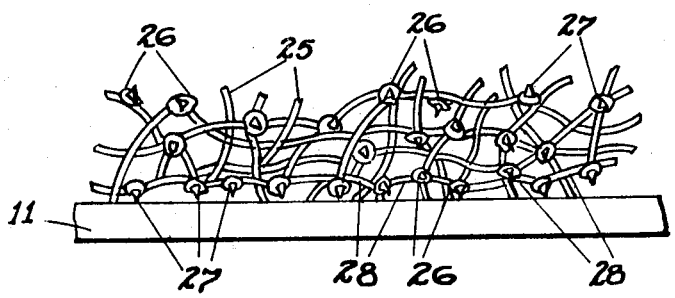

RECHARGEABLE ELECTROCHEMICAL POWER SUPPLY

FIELD OF THE INVENTION

Zinc-air storage cells have been proposed for use in the storage of electricity for industrial vehicles, electric motors, electric automobiles and unused output from atomic energy plants. Zinc-air cells are presently available having commercially feasible discharge properties. The present invention relates to improvements in zinc-air cells and other rechargeable cells whereby in addition to the advantageous discharge properties, the cells can also be rapidly recharged without any detrimental effect to the cell's ability to store and discharge electrical energy.

DESCRIPTION OF PRIOR ART

Zinc-air cells have been proposed for such applications as storage cells in industrial vehicles, electric motor cars and storage of periodic unused output from atomic energy plants. Employment of zinc-air cells for these applications has seriously been hampered because the zinc-air cell, which has advantageous discharge and storage properties, lacks the ability to be quickly recharged. When a zinc-air cell is subjected to the normal recharging cycle, such as used in recharging lead-acid storage batteries, zinc is electrodeposited on the zinc electrode in the form of columnar type growths called dendrites. The process is sometimes referred to as "treeing" because the electrodeposit formed on the zinc electrode resembles branches of trees. During the recharging cycle, these dendrites grow out from the zinc electrode on which they have formed and come into contact with the other positively-charged electrode which results in a short-circuited cell.

The rate of formation of dendrites increases as the battery charges. During the initial charging period a generally level deposit of zinc is obtained but as the charging period continues, the dendrites begin to form. This phenomena has made it extremely difficult to plate a relatively thick zinc deposit from alkaline electrolytes in prior art batteries.

In addition to the dendrite growth problem, zinc cells have been subject to failure by electrode shape change. "Shape change" is the loss of geometric surface area due to sluffing off and redistribution of zinc during charge and discharge cycling. Shape change results in a gradual loss of capacity and voltage with cycling and eventually the cell becomes no longer useful.

Zinc-air cells can be mechanically recharged by removing the used zinc electrode from the cell, replacing the used zinc electrode with a new one and replacing the cell electrolyte with fresh electrolyte solution. This process is inconvenient and time consuming. The caustic solution used as the electrolyte is not amenable to being conveniently stored and changed when needed and it can cause serious burns if it comes in contact with a person's skin or clothing.

Several attempts to provide separators between the electrodes to inhibit dendrite growth in these cells have been reported. French Patent 1,177,402, issued Apr. 24, 1959, demonstrates placing a porous diaphragm containing a material which can be oxidized by metallic zinc between the positive and negative electrodes to prevent the growth of the dendrites beyond the separator. U.S. Pat. No. 3,226,260, issued to Drengler demonstrates a specially-designed separator which is permeable to gas and electrolyte. The oxygen evolved at the positive electrode permeates the separator and as the dendrites grow to where they touch the separator, the zinc is oxidized and dissolved into the electrolyte.

These separators have not proved to be reliable. The porous nature of the separators is subject to fouling and contamination which severely hampers the operation of the separators.

In place of using separators, it has been suggested to impart motion to the zinc electrode. The turbulence of the electrolyte solution on the face of the zinc electrode retards columnar or dendritic growth; however, with a disc electrode, rotation of 100 to 1,400 revolutions per minute is required to retard the growth of dendrites and produce a somewhat uniform deposit. The rotation of the disc electrode can be reduced to 1 revolution per minute when the face of the zinc electrode is wiped by a relatively soft, elastic material such as rubber (see for example U.S. Pat. No. 3,440,098). The rubbing action bends the dendrite formations over and prevents them from shorting out the cell; however, a very rough and uneven zinc deposit is obtained. This uneven, rough surface hampers the efficiency of the cell during discharge and further increases dendrite growth during subsequent recharging. As a result, the zinc cell deteriorates with each charge and discharge cycle (similarly to the shape change phenomena mentioned above) becoming useless after a relatively few cycles.

Attempts have also been made to minimize shape change including the addition of binders such as Teflon and a reduction in the amount of mercury present in the electrode (used to prevent self-discharge of the zinc electrode and evolution of hydrogen during periods of nonuse).

The efforts represented by the prior art suggestions for reducing dendrite growth from the zinc electrode have concentrated solely on preventing the ultimate growth of a dendrite from the zinc electrode to the other electrode with subsequent shorting out of the cell. In each of the prior art methods mentioned above, columnar growth is retarded or prevented from extending past a barrier situated between the electrodes so that zinc electrodeposition can take place without shorting out of the cells; but the prevention of dendritic growth does not in itself improve the rate of zinc electrodeposition, it only allows the electroplating to proceed without shorting of the cells. It is, therefore, an object of this invention to provide a method whereby the formation of dendritic growth during recharging of an electrochemical cell is prevented and in addition the rate of electrodeposition is markedly increased resulting in a cell having the capacity to be recharged very quickly.

Another object of this invention is to produce a thick (greater than 1 mil and even up to 20 or 30 mil) deposit on the zinc electrode of a zinc-air or other zinc-electrode cell during the recharging of the cell.

A further object of the present invention is to produce a zinc electrode cell which can be discharged and recharged over a great many cycles without affecting the efficiency of the cell.

SUMMARY

The present invention is directed towards an improvement in zinc-air cells and other rechargeable electrochemical cells whereby the formation of dendrites on the zinc or similar metal electrode during the recharging cycle is prevented, shape change of the zinc electrode is eliminated and the rate of zinc or similar metal electrodeposit is markedly increased. These improvements are obtained by continuously and repetitively contacting the surface of the zinc electrode by what is termed herein as "dynamically hard" particles. By the term "dynamically hard" is meant the combination of the hardness of the particle, the contact pressure of the particle on the surface of the surface of the electrode and the speed at which the particle is moving relative to the metal layer surface is such as to produce an abrasive action on such surface sufficient to remove any electrodeposit forming a high spot on the metal layer surface and to mechanically "activate" the surface. "Activating" the surface of the electrode surface within the meaning of the present invention means so treating the surface to improve the utilization of current to deposit metal in sound adherent form rather than as powder and dendrites and appears to involve the removal of any polarization layer and reaction product layer from the electrode surface and the disarrangement of the atoms in the electrode surface layer to a degree sufficient to cause increased activity on the electrode surface. The activation of the electrode surface results in a markable increase in the rate of electrodeposition of zinc or similar metal on the electrode and prevents the development of dendritic formations on the surface of the electrode.

The process of activation of the surface of an electrode is fully described in my copending application, Ser. No. 34,500, filed May 4, 1970, entitled "Electrodeposition," now U.S. Pat. No. 3,619,384 which in turn is a continuation-in-part of application Ser. No. 718,468, filed Apr. 3, 1968 now abandoned. The entire contents of the copending application are incorporated herein by reference.

The activation of the surface of the zinc electrode results in an increased rate of electrodeposition which is reflected in the ability of the zinc-air cell to be recharged rapidly during the recharging cycle. The abrasive action prevents the formation of dendrites on the surface of the zinc electrode, and the zinc is electrodeposited in the form of a uniform smooth, dense coating on the electrode thereby eliminating the "shape change" problem associated with prior art cells. In addition, the present invention provides a method for obtaining a greater thickness of zinc during recharging than obtainable with prior art cells. Thus, the recharged cell of the present invention has an improved larger capacity or greater ability to store electrical energy than the prior art zinc cells.

DRAWINGS

The present invention is explained hereinafter in greater detail by reference to the accompanying drawings which show the preferred embodiments of this invention. It should be understood, however, that the drawings and examples are given for purposes of illustration only and that the invention in its broader aspects is not to be limited thereto.

IN THE DRAWINGS

FIG. 5 is a cross-sectional view of a zinc-air cell according to the invention wherein the air anode and the abrasive-activating means have been combined into one unit.

FIG. 7 is a vertical section of another set of zinc-air cell electrodes incorporating the present invention wherein the zinc anode and the abrasive-activating means both take the form of a plurality of cylinders.

FIG. 8 is a horizontal section taken along line 8—8 of FIG. 7.

FIG. 9 is a cross-sectional view of one embodiment of the porous-activating means of this invention.

In its broadest embodiment, this invention provides for the improvement in rechargeable electrochemical cells wherein the cell electrode, which functions as an anode during discharge and a cathode during recharge, is contacted by an abrasive-activating means during the recharge cycle. The abrasive-like action activates the surface of the electrode resulting in the ability of the cell to be rapidly recharged. In addition, the abrasive-activating means further prevents the formation of dendritic growth on the electrode during recharging. Thus, there is achieved a cell which has the capability of being rapidly recharged and which inherently prevents the formation of dendrites on the face of the electrode during recharging of the cell.

In a preferred embodiment, the invention provides for a zinc-air cell having the capacity to be recharged rapidly without the formation of dendritic deposits on the zinc electrode during recharge. While the above-mentioned drawings and the following description are directed to a zinc-air cell, it will be understood that other electrochemical active materials can be employed. For example, tin, nickel, lead, silver and other metals may be substituted for the zinc, and the alkaline systems described for the deposition of zinc may be replaced by acid systems when other active materials are to be deposited.

Figure 1:
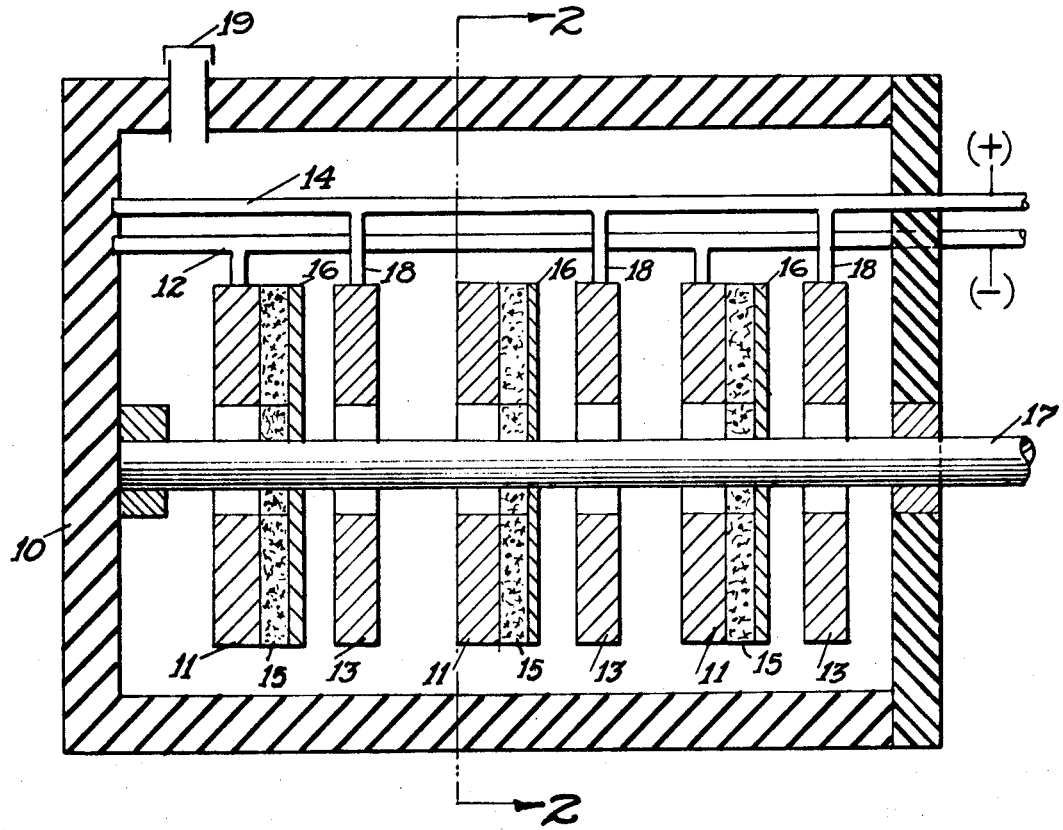
FIG. 1 is a cross-sectional view of a zinc-air cell which incorporates one preferred embodiment of the abrasive-activating means of this invention.
Figure 2:
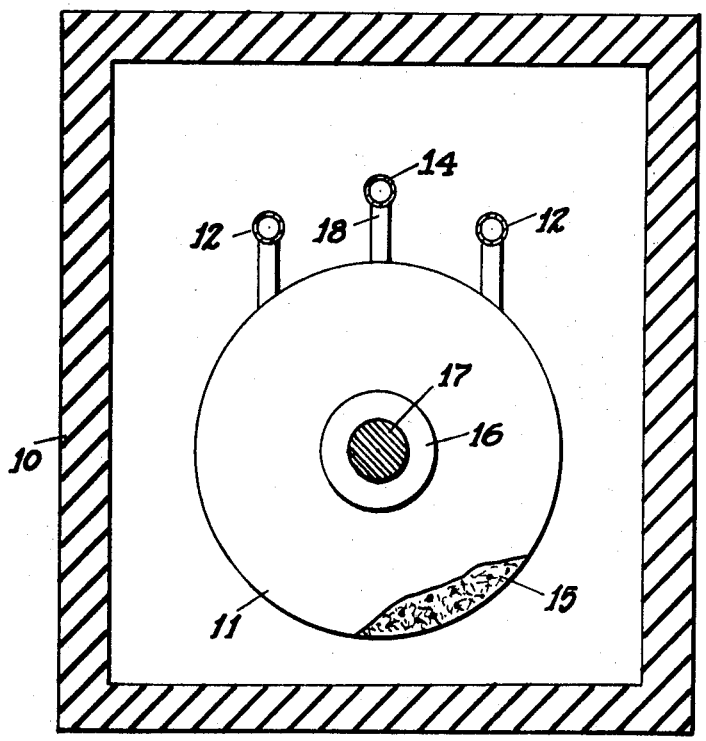
FIG. 2 is a cross-sectional view of the zinc-air cell of FIG. 1 taken along line 2—2 of FIG. 1.

Referring now to FIGS. 1 and 2, there is shown an electrochemical system employing the present invention. The system comprises a cell 10 containing a suitable electrolyte, and a set of zinc electrodes 11 suspended from bus bars 12. Gas-depolarized electrodes 13 are suspended from bus bar 14. Abrasive-activating pads 15 are attached to a back-up plate 16 which in turn is attached to shaft 17.

Shaft 17 can be rotated as well as moved longitudinally along its axis. During normal discharge of the battery, the shaft 17 is moved to such a position that the pads 15 and back-up plate 16 are spaced equidistant between anodes 11 and gas electrodes 13 and out of contact with either anodes 11 and gas electrodes 13. Bus bar 14 consists of a hollow tube of conducting material which supplies air to the gas-depolarized electrodes 13 through the hollow suspending bars 18. The electrochemical reactions taking place on the zinc anode and air-depolarized electrode in the potassium hydroxide zincate electrolyte are well described in the art. Zinc is dissolved to give zinc ions from the anode 11 and hydroxyl ions are formed at the air-depolarized electrode 13. When supplying air to the electrode 13, the nitrogen and other inert gases contained in the air are chemically inactive and must be vented from the cell through vent 19.

During the recharging cycle, the shaft 17 is moved longitudinally so that the abrasive-activating pads 15 are brought into contact with the face of electrodes 11. The shaft 17 is then rotated about its axis by appropriate means not shown in FIG. 1. The shaft 17 imparts rotation to the back-up plate 16 and abrasive-activating pads 15. A source of direct current is connected to bus bars 12 and 14 in such manner that the zinc electrode 11 is supplied with negative current and the gas electrode 13 is supplied with positive current. Metallic zinc is plated from the zincate, potassium hydroxide electrolyte on the zinc electrode 11 and oxygen is liberated at the gas electrode 13.

As explained above, the activation of the surface of electrode 11 is believed produced by mechanically distorting the surface of the face of the electrode. The amount of surface distortion or mechanical work is a function of the speed of the hard particles and the pressure exerted by the hard particles against the face of the electrode 11. At higher speeds less pressure is required and, likewise, at slower speeds more pressure is required. Sufficient speed and pressure requirements can easily be determined for the particular electrodes being activated. The process of activation is fully described in my copending applications, Ser. No. 34,500, now U.S. Pat. No. 3,619,384 and Ser. No. 863,499, now U.S. Pat. No. 3,619,401 filed May 4, 1970 and Oct. 3, 1969, respectively and abandoned application Ser. No. 718,468, filed Apr. 3, 1968, the entire contents of which are incorporated herein by reference.

The gas or air-electrodes 13 preferably contain catalytic substances such as silver, gold and platinum embedded in a porous structure such as demonstrated in U.S. Pat. No. 3,462,307. Other catalyst-containing porous plate electrodes known in the art can be employed in the practice of this invention.

Auxiliary electrodes serving for charging the electrochemically reversible zinc electrode 11 can be used instead of the gas-depolarized electrodes. For example, the back-up plate 16 could be made of nickel, stainless steel and iron. A source of positive electricity could be supplied to plates 16 through shaft 17.

The present invention may also make use of rechargeable or electrochemically reversible cathodes (anodes during recharge step) of the type conventionally employed coupled with anodes (cathodes during recharge step) such as silver/silver-oxide, and oxidized nickel electrodes.

The depolarizing gases used in conjunction with the porous gas electrodes can include halogens such as chlorine and fluorine in addition to oxygen and air.

The abrasive-activating medium comprises a porous supporting matrix containing a plurality of small, dynamically hard, relatively inflexible particles held in substantially fixed, spaced relationship to one another. The process requires relative motion during the recharge step between the electrode which is being plated and the activating medium. In addition, sufficient pressure is applied to the activating medium in a direction normal to the surface of the electrode sufficient to mechanically "activate" the surface. This means the removal of any polarization layer and reaction product layer from the electrode and the disarrangement of the atoms in the electrode surface to a degree sufficient to cause increased activity. The surface distortion produced by the present process amounts to introducing activity-enhancing defects in a substantially uniform manner in the electrode surface such as whole or partial dislocations, vacancies, stacking faults, twins, lattice distortions and the like.

Fresh electrolyte is supplied to the electrode surface through entrapment by the porous-activating medium. The porous medium sweeps fresh electrolyte over the surface of the electrode. This sweeping serves also to carry away depleted electrolyte or unwanted products resulting from the electrochemical reaction.

By the term "particle" as is used herein, is meant not only completely separate and discrete three-dimensional bodies, but also larger bodies with a plurality of points, tips, projections or the like thereon as for instance a relatively hard resinous coating on a fiber wherein the coating contains multiple irregular spaced projections and is generally uneven in nature.

The matrix used to support the activating particles is electrolyte-permeable and is also somewhat compressible and deformable so that it can be conformed to irregular surfaced electrodes and associated deposits where necessary. The matrix must have a plurality of liquid entrapping or sweeping members which define small compartments or pores which function much like a bucket conveyor in carrying small quantities of electrolyte over the activated electrode surfaces. Many variations of porous supporting matrices can be used, e.g., open mesh screens with activating particles adhered to the mesh, non-woven articles both compressed and uncompressed, open cell foam sheets with the activating particles incorporated in or on the foam cell walls. Examples of products which can be used in the present invention as activating media are illustrated in U.S. Pat. No. Re 21,852 to Anderson which shows an open-mesh product having abrasive grains adhered thereto; in U.S. Pat. No. 3,020,139 to Camp et al. which illustrates non-woven webs having a plurality of hard particles adhered to and along the web fibers; in U.S. Pat. No. 3,256,075 to Kirk et al. which illustrates a sponge containing hard resin-impregnated sponge particles; and in U.S. Pat. No. 3,334,041 to Dyer et al.

which illustrates a coated abrasive product having perforations through which electrolyte can flow. In this latter instance, the product must be modified for the present process by making it non-conducting, i.e., it essentially becomes a standard coated abrasive product with electrolyte-passing holes therethrough.

Figure 3:
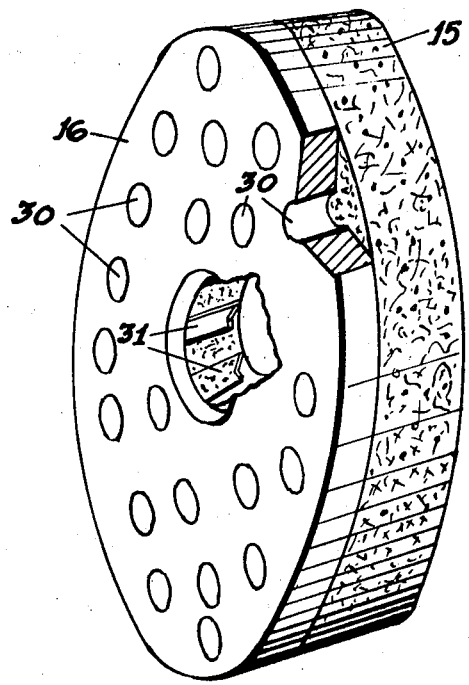
FIG. 3 is a perspective view partly in section of the abrasive-activating disc of FIG. 1.

Referring now to FIG. 3, there is illustrated the abrasive-activating pad 15 and back-up plate 16 of FIG. 1. The pad 15 is adhered to back-up plate 16. Back-up plate 16 can be made of any material which is inert to the caustic electrolyte such as nickel, iron or mild steel. The back-up plate 16 contains passageways 30 which are so shaped and positioned that when the back-up plate 16 is rotated liquid electrolyte will be pumped through the passageways 30 and into the pad 15. Also, the hub section of back-up plate 16 has a plurality of narrow baffles 31 fixed to the back-up plate 16 and extending therefrom. The pad 15 is circular in shape and has a section cut from its center so that the pad fits snugly over the baffles 31 and against the side of back-up plate 16. The baffles 31 are arranged such that when the back-up plate rotates they pump electrolyte solution into the pad 15. The distance which the baffles 31 extend from back-up plate 16 is somewhat smaller than the width of the pad 15.

FIG. 9 shows a highly enlarged and idealized portion of one type of activating media which is, in addition to those mentioned above, suitable for use in the present invention and illustrates the hard particle-connecting matrix relationship. Reference numeral 25 represents fibers of a non-woven web (non-conducting fibers such as poly[ethylene terephthalate] or the like) which are anchored one to the other at their points of intersection by an adhesive binder 26. A plurality of small, hard, discrete particles 27 are positioned on the fibers 25 and in the present illustration are held to such fibers by the adhesive 26. At least some of the fibers 25 extend relatively parallel to the zinc electrode 11 as shown at 28 to form the thin-walled cells or electrolyte sweeping members referred to above. (For purposes of illustration, the activating particles 27 are here shown at some distance from the electrode 11 although in operation of the present process they would be in contact therewith.)

Figure 4:
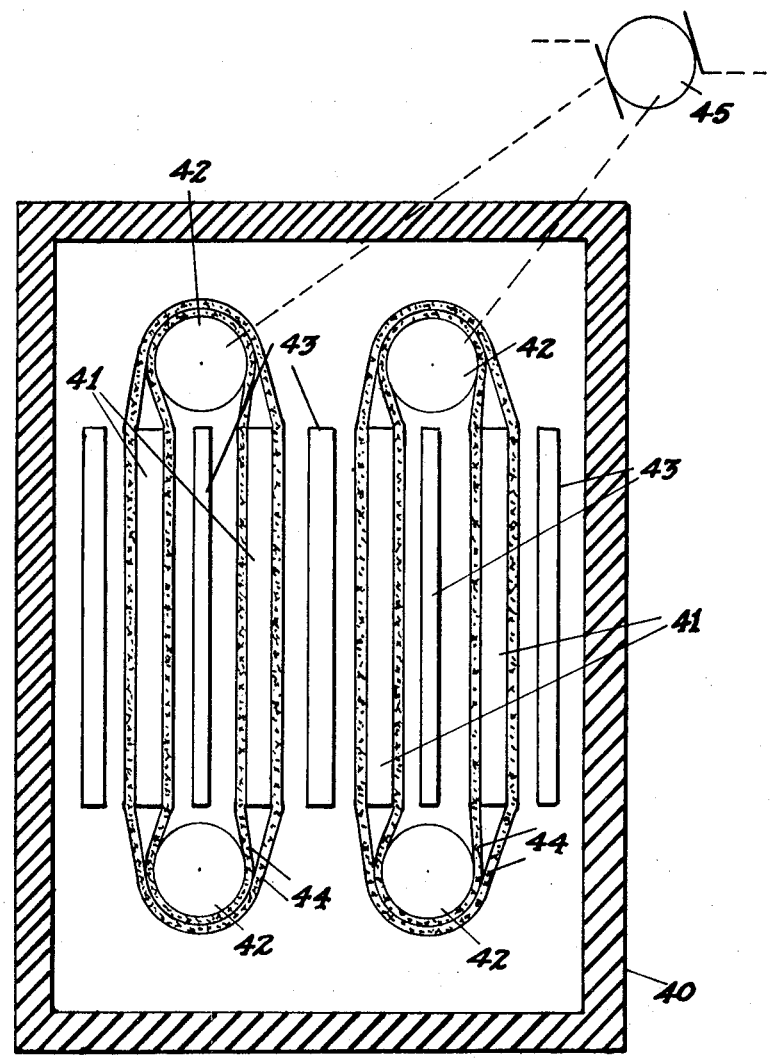
FIG. 4 is a cross-sectional top view of a set of electrodes from a zinc-air cell showing a second preferred embodiment of the abrasive means of the present invention.

FIG. 4 demonstrates another embodiment of the present invention. There is shown a top, cross-sectional view of a cell 10 having a plurality of zinc electrodes 41 and gas-depolarized counterelectrodes 43. The abrasive-activating means takes the form of continuous belts 44. The activating means is composed of the hard particle-containing matrix as in FIG. 9. The activating belts 44 are extended between rollers 42 which also drive the belt in a continuous circular motion. The belts 44 come into contact with the zinc electrodes 41 and during recharge of the cell perform the same function as the pads 15 of FIG. 1. That is, the abrasive-activating belts 44 activate the surface of the zinc electrode 41 thereby markedly increasing the rate of zinc electrodeposition thereon, and in addition the belts 44 mechanically prevent dendrites from extending from the zinc electrode 41 to the counterelectrodes 43. The rollers 42 are shown driven by motor 45.

During discharge of the cell, the belts 44 can be held stationary or rotated at a very slow speed. If the belt 44 is sufficiently porous the slow movement during discharge of the battery is not needed; however, a more efficient distribution of fresh electrolyte on the face of zinc electrode 41 will be obtained by slowly moving the belt 44 during discharge of the battery.

During the charge cycle, the belts 44 are driven at a rate sufficient to mechanically activate the face of the electrode 41 and supply the fresh electrolyte needed to the face of electrode 41. Sufficient tension must also be applied to belts 44 to exert sufficient pressure upon the faces of electrodes 41. As discussed above, for the apparatus in FIG. 1, the speed of belt 44 and the pressure exerted on the electrode surface 41 are selected to produce sufficient mechanical work to result in activation of the electrode 41.

FIG. 5 shows another embodiment of the present invention wherein the abrasive-activating means and the air electrode are incorporated into a single element.

The cell 50 comprises zinc electrodes 51 suspended from bus bar 52. A combined activating means and air electrode 53 consists of a porous abrasive-activating layer 54 having a cross section similar to that activating medium shown in FIG. 9 bonded to a porous electrical conducting layer 55 which is in turn bonded so as to make electrical contact with the back-up plate 56. The back-up plate is attached to a rotatable and longitudinally movable shaft 57. A circular opening 58 running axially along the center of shaft 57 supplies air through a distributing system 59 in back-up plate 56 to the porous electrical conducting layer 55. The electrical conducting layer is made from the same materials as the gas electrode 13 of FIG. 1.

The operation of the apparatus of FIG. 5 is similar to the operation of the apparatus of FIG. 1. During normal discharge of the battery, the combination activating means and air-electrode 53 is positioned so that the activating layer 54 is not in contact with the zinc electrode 51. Air is supplied to the electrical conducting layer 55 and the electrochemical reactions discussed above for the apparatus of FIG. 1 take place at the zinc and air electrodes.

During recharge of the cell 50, the shaft 57 is moved longitudinally so that the activating layer 54 of the combined activating means and air electrode 53 is brought into contact with the surface of zinc electrode 51. The shaft 57 is also given a rotational movement. A source of negative current is supplied to the zinc electrodes 51 and positive current to back-up plate 56 through shaft 57. The electrodeposit of zinc is then accomplished in the same manner as discussed above for the apparatus of FIG. 1.

Figure 6:
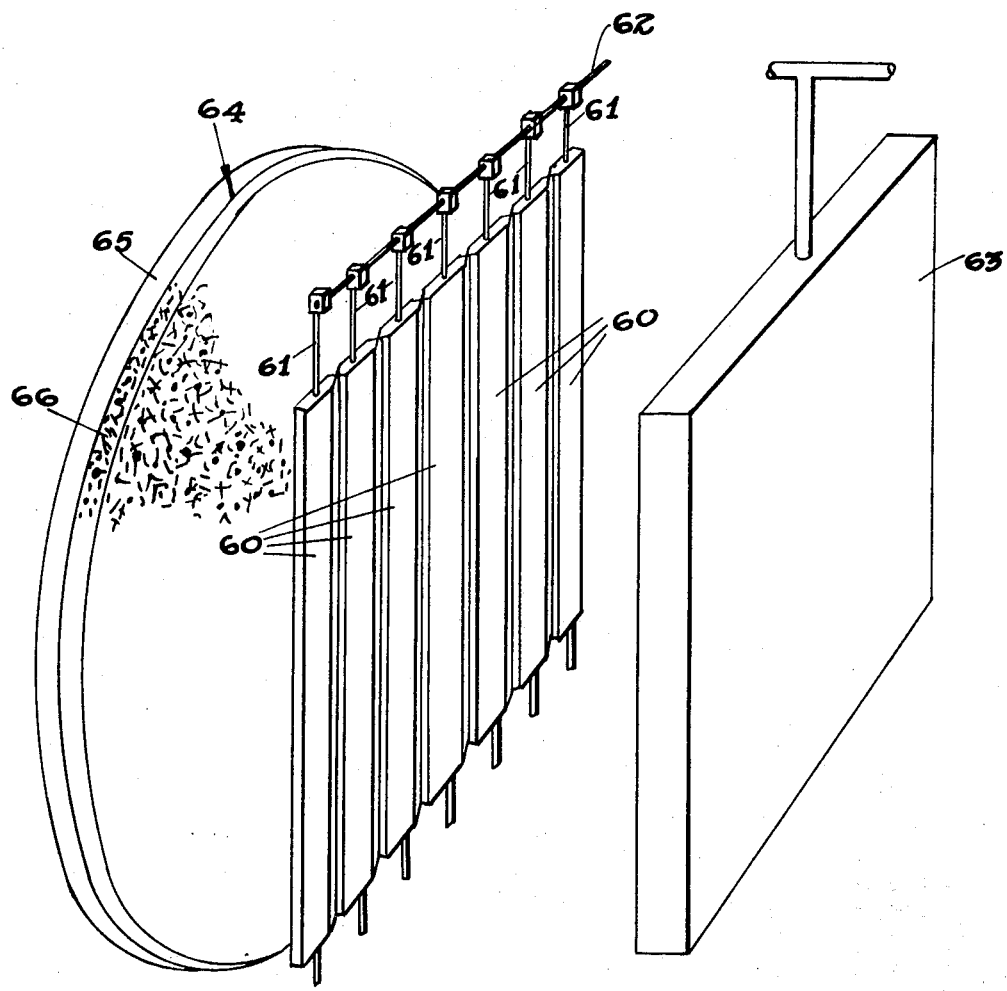
FIG. 6 is a perspective view of an electrode couple from a zinc-air cell according to this invention wherein the zinc anode is made of a plurality of sections of rectangular cross section which can be rotated in such a manner that the face of the anode can be revolved so that the anode faces the abrasive-activating means during the recharge of the battery.

FIG. 6 shows still another embodiment of the present invention wherein the zinc electrode is composed of a plurality of slats 60 which can revolve about their individual axis. The slats 60 are suspended by rolls 61 which in turn are suitably connected to shaft 62 in such a manner so that as shaft 62 is rotated, the slats 60 revolve 180°. On one side of the zinc electrode there is suspended an air electrode 63 which is similar to the air electrode 13 of FIG. 1. On the other side of the zinc electrode there is situated a rotatable abrasive-activating means 64 consisting of a back-up plate 65 and a hard particle containing porous matrix layer 66. The abrasive-activating means is similar to the abrasive-activating means 15 and 16 of FIG. 1.

During normal discharge, the zinc surface of electrode slats 60 face the air electrode 63. During recharge the electrode slats 60 are revolved so that the zinc surface faces the abrasive-activating means 64. The abrasive-activating means is advanced toward the electrode slats 60 until the porous matrix 66 makes contact with the zinc surface of electrode slats 60. The abrasive-activating means is rotated by suitable means not shown and a source of current is supplied to the electrode slats 60 and back-up plate 65. Zinc is electrodeposited on the surface of slats 60 in a manner similar to that process described for electroplating the zinc electrode of FIG. 1.

FIGS. 7 and 8 show an electrode couple exhibiting still another embodiment of the present invention. The zinc electrode is formed from a plurality of cylinders 71. The cylinders can be made of iron, nickel or mild steel having an electrodeposited layer of zinc thereon. The abrading activating means takes the form of a plurality of cylinders 72 which can be made of iron, nickel or mild steel. The activating cylinders 72 are covered with a porous matrix, hard particle-containing material 73 similar to that shown in FIG. 9. Each abrasive-activating cylinder is positioned equidistant from two electrode cylinders 72 and displaced to one side of the line joining the center of cylinders 72 in such a manner that the porous matrix, hard particle material 73 on the surface of the cylinder 72 comes into contact with the surface of the two cylinders 71 of which it is equidistance from. The cylinders 72 can also be moved away from cylinders 71 so that no contact is made between cylinders 71 and 72. The gas-depolarized electrode 74 is positioned near the zinc electrode 71 on the side opposite from which the cylinders 72 are positioned.

During normal discharge of the battery, the cylinders 72 are moved away from and out of contact with cylinders 71. The zinc dissolves into the caustic electrolyte and reacts with oxygen at the gas-depolarized electrode 74.

During recharge, the cylinders 72 are moved towards cylinders 71 so that the porous abrasive matrix 73 comes into contact with the surface of cylinders 71. Provision is made to rotate both cylinders 71 and 72 in such a manner that the speed of the surfaces of cylinders 71 and 72 vary at least 15% from each other. It is preferred to have cylinders 72 rotating in the opposite direction to that which cylinders 71 are rotating. A source of direct current is connected to cylinders 71 and 72 and zinc is electroplated on the surface of cylinders 71.

It will be recognized that the electrodes shown diagrammatically in the cell of FIG. 1 are in so-called "-parallel" arrangement. Such a call as shown in FIG. 1 is restricted to voltage of the zinc-air or other electrode couple used. It is thus a low voltage but high amperage type cell.

Figure 10:
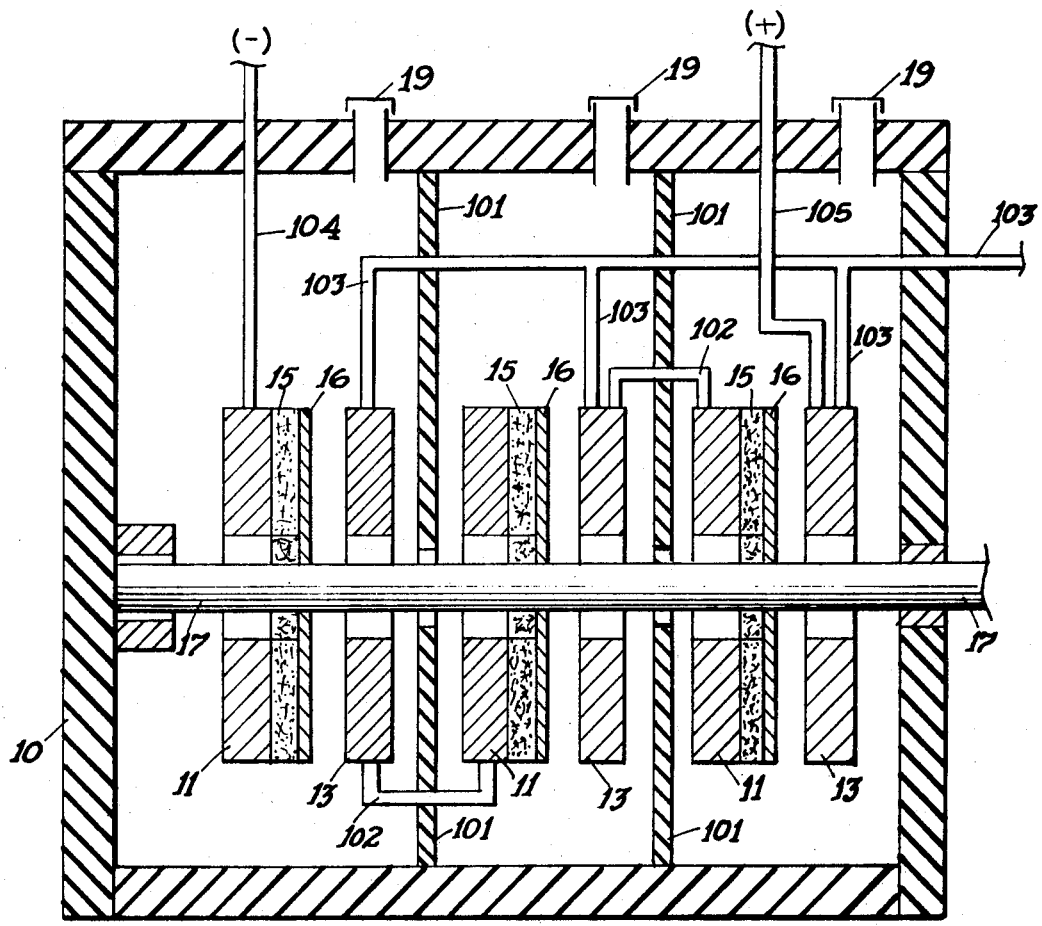
FIG. 10 is a cross-sectional view of a composite battery composed of three separate cells incorporating the present invention.

In FIG. 10, a battery is shown diagrammatically whereby the electrode pairs constituting the battery are separated from each other by partitions 101. The individual electrodes are connected in series by bus bars 102. The posts of the battery 104 and 105 have a voltage potential equal to three times the voltage of a single zinc-air or other electrode air used. In this arrangement, air must be supplied to the air electrodes by a non-conducting supply duct 103.

Figure 11:
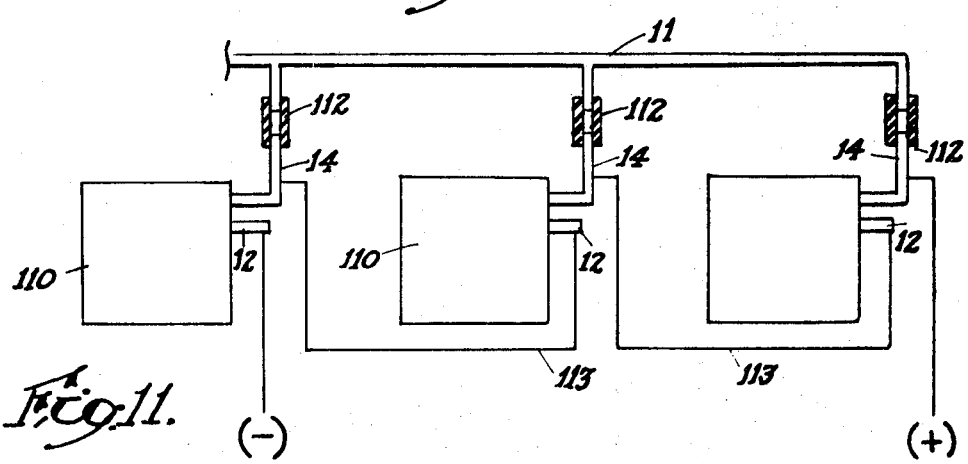
FIG. 11 is a schematic diagram showing cells similar to those of FIG. 1 arranged in series.

The cell of FIG. 1 can be arranged in series with other like cells as shown schematically in FIG. 11. The cells, like those of FIG. 1, denoted by the number 110, are connected together in series by suitable electrically conducting means 113. In this arrangement, air must be supplied to the air electrodes through supply means 111 which is connected to electrodes 14 by an electrically non-conducting connector 112.

EXAMPLE

A mild steel disc one-fourth by 3 inches was electroplated on one face with zinc at a current density of 505 amps per square foot. The disc was immersed into an electrolyte similar to the electrolyte used in commercial zinc-air batteries, that is a solution containing 34.5 grams per liter of ZnO and 291.8 grams per liter of KOH. The surface of the disc which received the electroplate was brought into contact with a disc similar to the activating disc of FIG. 1. The activating disc was rotated at 500 revolutions per minute. A pressure of 2–4 pounds per square inch was used to press the activating disc against the electroplated disc.

The porous matrix surface of the activating disc was made from a non-woven nylon material bonded together as shown in FIG. 9 with a polyurethane resin. The bonded matrix was impregnated with 600 mesh SiC particles.

A source of direct current was connected to the mild steel disc and the back-up plate of the activating disc. After five minutes of plating a zinc plate 5 mils thick was adhered firmly to the face of the steel disc which had been in contact with the porous abrading disc. The zinc deposit was smooth, hard and evenly plated on the steel disc. The rate of zinc deposition during recharge of prior art zinc-air batteries is approximately 0.05 to 0.1 mil per minute.

It can be seen that a zinc-air battery according to this invention can be recharged at a rate 10 to 20 times faster than as reported possible in prior art batteries. The zinc deposit obtained according to this invention does not exhibit dendrite formation on its surface, it is smooth, dense, hard and adheres firmly to the electrode to which it has been plated. A thick zinc deposit can be obtained on the zinc electrode during recharge of the battery resulting in a battery having an increased capacity with respect to the prior art batteries. The uniform, dense, smooth, hard surface formed on the zinc electrode during recharge allows the cell to be recharged many times more than the prior art battery without any decrease in efficiency.

The electrodes of the present invention are not subject to failure by "shape change" as are the electrodes of prior art cells, and therefore, there need be no reduction in the mercury content of the electrodes as done in prior art cells to reduce the "shape change" effect. The present electrodes can contain the normal amount of mercury necessary to prevent self-discharge of the zinc cell.

What is claimed is:

1. A rechargeable electrochemical power supply comprising:
   a. a body of aqueous electrolyte;
   b. an electrically conductive cathode permeable to the passage of air and oxygen therethrough while being substantially impermeable to the passage of electrolyte, said cathode having a surface in electrolytic contact with said electrolyte and a means for supplying oxygen-containing gas to the interior of said cathode;
c. a conductive anode material in electrolytic contact with said electrolyte;
d. a supporting medium having a plurality of spaced small hard particles disposed between said anode and said cathode;
e. means for establishing relative motion and contact between the surface on said anode material and the particles supported by said supporting means whereby the said entire surface of said anode material is continuously mechanically activated at least during any recharge cycle;
f. electrical terminal means respectively electronically connected to said anode material and said cathode for interconnection to an electrical load; and
g. means for interconnecting a source of electrical power to said terminals whereby the power supply is recharged for subsequent reuse.

2. A rechargeable power supply as in claim 1 wherein the conductive anode material is zinc.

3. A rechargeable power supply as in claim 2 wherein the supporting medium containing the spaced particles thereon makes contact with the zinc anode only during the recharge cycle and a means is supplied to withdraw said supporting medium from the surface of the zinc anode during the period in which power is supplied to an external load.

4. A rechargeable power supply as in claim 2 wherein said supporting means comprises an electrolyte-permeable matrix having said plurality of small particles adhered to in fixed spaced relationship one to the other.

5. A rechargeable power supply as in claim 4 wherein said matrix comprises a porous non-woven web.

6. A rechargeable power supply as in claim 4 wherein said matrix comprises an open-weave fabric.

7. A rechargeable power supply as in claim 6 wherein said particles comprise abrasive grains.

8. In a rechargeable electrochemical current generator including a reversible electrode and a counterelectrode, said reversible electrode having a working surface of active material confronting said counterelectrode, said active material being prone to develop growth formations extending toward said counterelectrode during recharge, the combination therewith of a supporting medium having a plurality of spaced small hard particles thereon interposed between said reversible electrode and said counterelectrode, means for imparting relative motion and contact between the working surface on said reversible electrode and the particles on said supporting medium at least during recharge whereby said entire working surface is continuously and repetitively mechanically activated and said supporting means continuously prevents said growth formations from forming on said working surface.

9. A rechargeable generator as in claim 8 wherein the reversible electrode is zinc.

10. A rechargeable generator as in claim 9 wherein the supporting medium containing the spaced particles thereon makes contact with the reversible electrode only during the recharge cycle and a means is supplied to withdraw said supporting medium from the working surface of the reversible electrode during the period in which the generator produces current.

* * * * *